United States Patent [19]

Dulger

[11] 4,082,676
[45] Apr. 4, 1978

[54] DIRT FILTER FOR WATER PIPES

[76] Inventor: Viktor Dulger, Ludolf-Krehl-Strasse, 8 Heidelberg, Germany, 6900

[21] Appl. No.: 778,034

[22] Filed: Mar. 16, 1977

[30] Foreign Application Priority Data

Apr. 10, 1976 Germany ............................ 2615922

[51] Int. Cl.² ............................................ B01D 35/02
[52] U.S. Cl. .................................. 210/447; 210/451; 210/456
[58] Field of Search ............... 210/407, 437, 438, 439, 210/451, 455, 332, 447, 94, 311, 313, 456

[56] References Cited

U.S. PATENT DOCUMENTS

| 790,346 | 5/1905 | Cowern | 210/332 |
|---|---|---|---|
| 1,673,391 | 6/1928 | Brubaker | 210/455 X |
| 2,108,798 | 2/1938 | Dalrymple | 210/451 X |
| 2,823,804 | 2/1958 | Myring | 210/438 X |
| 3,122,501 | 2/1964 | Hultgren | 210/451 X |
| 3,931,011 | 1/1976 | Richards et al. | 210/335 X |

Primary Examiner—William A. Cuchlinski, Jr.

[57] ABSTRACT

The invention relates to a dirt filter for water pipes of the type used for carrying water for household and industrial use. The filter defines inlet and outlet chambers with an apertured dividing wall therebetween. An upper lid and a lower dirt collecting container and attached with threaded connections to the housing. A filter insert is disposed between the lid and the dividing wall and the insert has a carrier with upper and lower cylinder rings which respectively engage the lid and the chamber dividing wall. The interior of the filter has fluid communication with the inlet chamber through the opening in the chamber dividing wall. An annular, cup shaped insert keeps the flow in the inlet chamber away from the interior of the dirt collecting container but permits the drop of dirt into this container.

3 Claims, 1 Drawing Figure

U.S. Patent  April 4, 1978  4,082,676
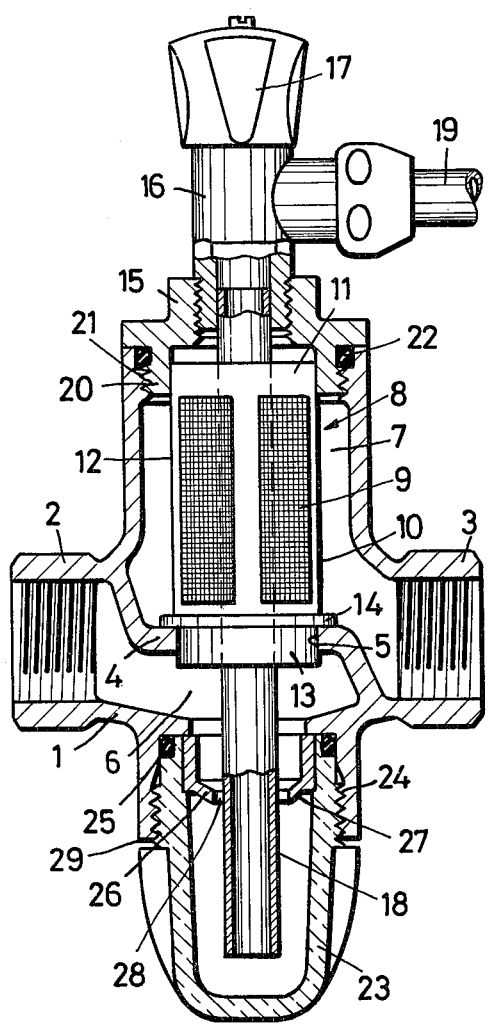

DIRT FILTER FOR WATER PIPES

The invention relates to a dirt filter for water pipes of the type used for carrying water for household and industrial use. The filter defines inlet and outlet chambers with an apertured dividing wall therebetween. An upper lid and a lower dirt collecting container are attached with threaded connectiong to the housing. A filter insert is disposed between the lid and the dividing wall and the insert has a carrier with upper and lower cylinder rings which respectively engage the lid and the chamber dividing wall. The interior of the filter has fluid communication with the inlet chamber through the opening in the chamber dividing wall. An annular, cup-shaped insert keeps the flow in the inlet chamber away from the interior of the dirt collecting container but permits the drop of dirt into this container.

In a known dirt filter of this type the lid is mounted on the housing with four screws. The filter insert extends up to the upper front side of the housing and is retained there through a gasket ring placed between lid and housing. The container has an upper flange and is forced against the lower front side of the housing having embedded therein a gasket by means of a screw cap. In order to form the dividing means an extension is inserted into a passage connected between the inlet chamber and a lower front side, said extension serving as calming zone and preventing a direct inlet of the flow at the inlet side to the interior of the container.

The dirt filter herein provides several advantages. The filter material broadly is arranged symmetrically and the dirt does not collect within the range of the filter. The dirt collecting container is transparent so that the dirt can be well observed.

A main object of the invention is to provide a dirt filter having a relatively few number of parts, is easily mounted and has a relatively low overall height.

In accordance with the invention the objects are achieved in part in that the lid and the dirt collector respectively carry outer threads by means of which they are directly screwed into respectively internally threaded bores in the housing. The outer threads of the lid are on a cylindrical collar thereof which surround the upper cylinder ring of the carrier. The dirt collector extends into close proximity to the inlet chamber and a baffle is formed by an insert in the upper portion of the dirt collector.

With this construction the lid and the dirt collector or container are screwed directly to the housing and additional screw mounting means are not required. Tolerances in the axial length of the filter insert with respect to the mounting space of the housing are insignificant as the cylindrical collar at the lid serves to seal the outer periphery of the filter insert. Although the outer threads at the lid and the dirt container require a certain axial extension, this does not cause an increase of the height of the dirt filter because the lid and the dirt collector in each case project considerably into the housing. At the lid the housing attached to the cylindrical collar overlaps the filter insert. The container extends so close to the inlet chamber that it does not leave any space for a baffle. A baffle is thus provided in the form of an insert in the container. This baffle arrangement permits a smaller height for the housing which can then be a relatively simple casting.

A further improvement is that said lid and/or container can be sealed at the housing with a U-type gasket ring placed about the outer periphery. Such a gasket ring can be easily attached as there are existing peripheral walls projecting into the housing. This provides safe sealing without the requirement of strong screw forces.

It is likewise an advantage that the lower cylinder ring of the filter insert engages the opening in the dividing wall and the surrounding flange rests on the dividing wall. Such a filter insert can be easily inserted into the housing prior to attaching the lid. If the lid should allow the filter insert to move slightly upwardly, this is not a disadvantage because the lower cylinder ring remains sealed relative to the opening in the dividing wall.

In the illustrated embodiment of the invention the insert is cup-shaped and has a hole in the bottom thereof. This bottom portion serves as a baffle to prevent the direct influence of the inflowing medium on the inner chamber of the container. As the cup bottom portion is a certain distance from the inlet chamber, the flow into the chamber has only a minimal effect. During dormant times, dirt retained in the filter insert can be dislodged therefrom by vibration or back rinsing and drop into the container. If necessary the insert bottom portion may have a conical shape or the like to facilitate the passage of the dirt through the hole.

It is a special advantage if the casing is made of brass or bronze. These materials permit the cutting of sufficiently fine threads which are useful if a small pitch is desired despite the intended thread diameter.

A further reduction of the overall height is obtained if the container is substantially the same height as the filter insert. There is no obstacle to the container filling with dirt up to the bottom portion of the insert before cleaning is required.

Other objects of the invention will become apparent from the following specification, drawing and appended claims.

In the drawing there is shown a partial, vertical sectional view of a dirt filter embodying the invention.

Referring to the drawing a brass housing 1 is provided with a threaded inlet port 2 and a threaded outlet port 3. A dividing wall 4 having a circular opening 5 separates an inlet chamber 6 from an outlet chamber 7.

A filter insert 8 has filter material 9 which is retained by a carrier 10. The carrier has an upper cylonder ring 11, four or more struts 12, and a lower cylinder ring 13. Ring 13 sealingly fits into the opening 5 and is provided with a flange 14 which limits the lower-most position of the filter insert 8.

A lid 15 has connected thereto a fixture 16 with a shut-off valve 17, a downwardly projecting pipe 18, and an outlet conduit 19. The lid is further provided with a cylindrical collar 20 having an outer thread 21. The inner periphery of the collar has sealing engagement with upper cylinder ring 11 of carrier 10. An O-ring gasket 22 is between the two cylindrical surfaces of the lid and the housing.

A transparent dirt collector or container 23 also has an outer thread 24 which is screwed into an internally threaded collar which extends downwardly from the housing 1. The top of the container 23 is close to the inlet chamber 6. An O-ring gasket 25 is provided in an annular recess in container 23. A cup-shaped insert 26 is inserted into the upper portion of the container 23. Insert 26 has a hole 28 in the bottom 27 thereof. Pipe 18 extends through and is in spaced relation to the hole 28. Container 23 has a height somewhat less than that of the filter insert 8. Container 23 requires emptying through the shut-off valve 17 only if it is filled with dirt up to or above the lower edge 29 of housing 1.

The mounting operation is very simple. The filter insert 8 is inserted from above into housing 1. Lid 10 is screwed thereto from above. Container 23, having inserted therein insert 26, is screwed thereto from below. Fixture 16 can be attached prior to or subsequent to the attaching of lid 15 to the housing 1.

I claim:

1. A dirt filter for water pipes defining a housing with lower and upper chambers having an inlet and an outlet respectively, a dividing wall with an opening therein separating said chambers, a lid closing the upper side of said upper chamber, said lid having a cylindrical collar with outer threads, a dirt collecting container below said lower chamber and having outer threads at its upper part, said housing defining internally threaded collars for threaded connection with said lid and said container, a cylindrical filter insert in said upper chamber having a carrier with an upper ring in sealing engagement with said collar of said lid and a lower ring engaging said dividing wall, the interior of said filter insert being in fluid communication with said lower chamber, said housing defining a dirt egress opening in its lower wall providing fluid communication between said lower chamber and said dirt collecting container, and an annularly shaped baffle insert having a central opening and being positioned in the upper part of said dirt collecting container.

2. A dirt filter for water pipes according to claim 1 wherein a flange for engagement with the periphery of said dividing wall opening surrounds said lower ring of said filter insert carrier.

3. A dirt filter for water pipes according to claim 1 wherein said annularly shaped insert is cup-shaped.

* * * * *